United States Patent Office 2,824,090
Patented Feb. 18, 1958

2,824,090

POLYMERIZATION OF α-OLEFINS WITH A CATALYST MIXTURE OF AN ORTHOTITANATE AND AN ALKYL ALUMINUM HALIDE

Marvin B. Edwards and Hugh J. Hagemeyer, Jr., Longview, Tex., assignors to Eastman Kodak Company, Rochester, N. Y., a corporation of New Jersey No Drawing. Application December 27, 1955
Serial No. 555,229

18 Claims. (Cl. 260—88.1)

This invention relates to a new and improved polymerization process and is particularly concerned with the use of a novel catalyst mixture for preparing high molecular weight solid polyolefins, such as polyethylene, of high density and crystallinity. More specifically, the invention is concerned with improved processes for polymerizing normally gaseous monoolefins such as ethylene, propylene, or mixtures thereof, to give polymers having densities and rigidity higher than those achieved by conventional high pressure polymerization processes and in unusually high yields of polymer per unit of catalyst.

Heretofore, polyethylene was generally prepared by high pressure polymerization techniques which gave highly useful polymers which were relatively flexible and low softening. High pressure polyethylene is characterized by a relatively high degree of chain branching and a density which is considerably lower than the theoretical density. Usually, pressures in excess of 500 atmospheres and commonly of the order of 1000–1500 atmospheres are employed to effect the polymerization to solid polymer. Such pressures have been necessary even with the use of oxygenated catalysts such as the peroxides.

For many years, olefins have been catalytically polymerized to give low molecular weight liquid polymers. More recently, certain organometallic compounds such as lithium aluminum hydride alone or aluminum trialkyls alone have been proposed as polymerization catalysts to give polyolefins of unusually high crystallinity and density characteristics. These efforts, however, were not too successful when the organometallic compound was employed alone. The alkyl aluminum halides have also been used, without too great success, as olefin polymerization catalysts. Subsequently, activators such as titanium or zirconium chlorides were employed to increase the activity of the aluminum trialkyls or alkyl aluminum halides. In many cases, the catalyst mixtures employed were not readily removed from the polymer formed, which led to objectionable color formation in the polymer. As with all polymerization processes, it is also desirable to increase the rate of polymer formation and the total yield thereof to as high a value as possible. The titanium tetrachloride activators particularly give highly unstable catalyst mixtures with the aluminum alkyls and alkyl aluminum halides so that the catalyst mixture could not be stored for any prolonged period of time without losing a great deal of its catalytic activity.

Accordingly, it is an object of this invention to provide an improved process whereby normally gaseous α-monoolefins are readily polymerized by particular catalyst mixtures as defined hereinafter to give high molecular weight solid polymers of improved softening temperature, density, crystallinity, and stiffness in unusually high yields. A particular object of the invention is to provide an improved process for preparing a wide variety of poly-α-olefins at relatively low pressures which, in some cases, range as low as atmospheric pressure and at temperatures ranging from 20 to 150° C. Another object of the invention is to provide new and improved catalyst mixtures for effecting polymerization of gaseous α-olefins to solid polymer without objectionable color buildup in the polymer thereby formed due to residual catalyst. Another object of the invention is to provide catalyst mixtures which retain their catalytic activity after storage and which can therefore be prepared in quantity and stored until needed. Another object of the invention is to provide an improved process for making polyethylene, polypropylene, or ethylene-propylene copolymers having the improved characteristics described herein.

These and other objects which will be apparent from the description and claims which follow are attained by means of the process embodying the present invention wherein normally gaseous α-monoolefins, either singly or in admixture, are readily polymerized to high molecular weight, crystalline, solid polymers by effecting the polymerization in the presence of a catalytic mixture of a tetraalkyl orthotitanate wherein each alkyl group contains 8–13 carbon atoms and alkyl aluminum halide wherein each alkyl group contains 2–12 carbon atoms. Ordinarily, it would be expected that the lower alkyl esters of orthotitanic acid would be preferably used for optimum activity as well as for convenience and economy. For some reason which is not readily apparent, it has now been found that the alkyl aluminum halides form quite unique catalyst combinations when the activator is a tetraalkyl ester of orthotitanic acid with a higher alcohol containing 8–13 carbon atoms. These higher alkyl esters when employed in combination with the alkyl aluminum halide give greatly improved yields over the lower alkyl esters, and the catalyst system is characterized by an unusually high degree of stability during storage. The polymerization in accordance with the invention is very fast, and consequently there are significant savings in time and substantial reductions in the size of equipment which result in substantial savings in the cost of manufacturing solid polyolefins. The orthotitanate esters of this invention hydrolyze much less readily than do the titanium halides which have been employed to activate the alkyl aluminum halides. The nature of the catalyst combination greatly simplifies the catalyst handling techniques. Furthermore, the tetraalkyl orthotitanates are not themselves corrosive, nor do they hydrolyze to yield corrosive products. This is a particular advantage as contrasted to the titanium tetrahalides which form hydrochloric acid on hydrolysis and thus present a serious corrosive problem. As has been indicated, the catalyst combinations embodying the invention retain a high degree of activity for extended periods of time. This greatly facilitates the commercial manufacture of solid polymers because the catalysts, unlike those prepared from the titanium tetrahalides, not only retain their activity but show little tendency to deposit black inactive precipitates which complicate the purification of the product. The polymers prepared in accordance with this invention have greatly improved color because the alkyl orthotitanates are readily soluble in most organic solvents and are easily washed from the polymer after the polymerization has been completed. When titanium tetrahalides are used as catalysts, washing of the product needs to be much more thorough, and even after thorough washings with alcohols or with dilute solutions of bases or acids, some traces of the catalyst still remain which have a tendency to discolor the product.

It has been found that the catalysis of ethylene and similar olefins to form solid high density polymers is highly unpredictable and largely empirical. Thus, the reason for the unexpected advantages of the catalyst combinations embodying this invention is not well understood and was wholly unexpected. Any of the well known alkyl aluminum halides wherein each alkyl group contains 2–12 carbon atoms can be used in the catalyst combinations embodying the invention. Thus, the monoalkyl aluminum dihalides can be used or the dialkyl aluminum monohalides can be used with equally advantageous results. Since a mixture of these two types of alkyl aluminum halides is ordinarily formed by solution of aluminum metal in alkyl halide, the so-called alkyl aluminum sesquihalides which are composed of substantially equimolar amounts of monoalkyl aluminum halide and dialkyl aluminum monohalide are generally employed rather than separating the components. Generally, the alkyl aluminum chlorides or bromides are preferably employed for optimum activity, although the other halides such as the fluorides can also be used.

The improved results of the present invention are obtained by employing a tetraalkyl orthotitanate wherein each alkyl group is either straight or branched chain, and contains 8–13 carbon atoms. Thus, the orthotitanate esters preferably employed in practicing the invention include such materials as tetra-2-ethyl-hexyl orthotitanate, tetraoctyl orthotitanate, tetradecyl orthotitanate, tetralauryl orthotitanate, and tetratridecyl orthotitanate, or similar orthotitanate ester wherein the alkyl groups each contain 8–13 carbon atoms. The chain length is a critical factor because the lower and higher chain length alkyl esters give greatly lowered yields of the desired solid polymer. Any of these or similar orthotitanate esters can be employed in combination with such materials as ethyl aluminum sesquibromide, ethyl aluminum sesquichloride, methyl aluminum dibromide, dimethyl aluminum bromide, methyl aluminum dichloride, dimethyl aluminum chloride, ethyl aluminum dibromide, diethyl aluminum bromide, ethyl aluminum dichloride, butyl aluminum dibromide, dibutyl aluminum chloride, hexyl aluminum dibromide, dihexyl aluminum bromide, decyl aluminum dibromide, decyl aluminum dichloride, dodecyl aluminum dibromide, dodecyl aluminum dichloride, didodecyl aluminum bromide, didodecyl aluminum chloride, and similar alkyl aluminum halides or mixtures thereof.

The inventive process is carried out in liquid phase in an inert organic liquid, and preferably an inert liquid hydrocarbon vehicle. The process proceeds with excellent results over a relatively wide temperature range with temperatures of 20–130° C. being preferably employed, and particularly good results being obtained in the range of 60–100° C. The pressure can be varied as desired, with pressures as low as atmospheric pressure being operable. Generally speaking, however, it is desirable to employ a pressure in the range of 0–1000 p. s. i. g. with pressures of from 0 to 20 p. s. i. g. being preferred for optimum yields. In some cases, higher pressures such as are employed in the conventional high pressure processes can be used but are usually not necessary. Thus, pressures of as much as 20,000 p. s. i. g. or higher can be used in some instances. The liquid vehicle employed is desirably one which serves both as a liquid medium and as a solvent for the solid polymerization products at the temperature of polymerization.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p. s. i. and a stiffness in flexure at 5% deflection (ASTM test D747–50) of at least 50,000 p. s. i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixtures include such materials as n-butylene, isobutylene, 1-pentene, 1-decene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The combination of at least one alkyl aluminum halide with at least one tetraalkyl orthotitanate as defined herein possesses a number of important advantages over prior art processes. For example, the rate of polymerization is unusually high, and the yield of solid polymer per unit of catalyst is unusually good. The catalyst is readily removed from the polymeric product, and the color of the product is unusually good. The catalysts can be readily handled and do not hydrolyze or form corrosive products which would otherwise attack the polymerization apparatus. The activity of the catalysts embodying the invention permits the polymerization to be carried out over a wide range of pressures, and it is not necessary to employ extremely high pressures such as were necessary heretofore. Ordinarily, pressures as low as atmospheric pressure can be readily used, and pressures of 0–1000 and preferably 0–20 p. s. i. g. are completely operable and give excellent yields. The use of such low pressures results in considerable economy over the conventional high pressure processes which operate in the range of 1000–2000 atmospheres or higher in most cases. The unusual storage stability and retention of activity of the catalysts embodying the present invention makes it possible to prepare the catalyst in bulk and use it as made rather than having to prepare catalyst freshly before use. This is of particular advantage in continuous processes since the catalyst bulk can be stored and continuously added to the polymerization system. The only precautions necessary in practicing the invention are that the polymerization mixture be dry and free of compounds containing active hydrogen. Ordinarily the polymerization system is maintained under nitrogen, and then the nitrogen is replaced with the ethylene or other olefin to be polymerized.

The only limitation on the temperature at which the process can be effected is the decomposition temperature of the catalyst. The pressure employed need be only sufficient to maintain the reaction mixture in liquid form during the polymerization. Since the catalyst mixture employed consists of components which are either readily soluble or readily dispersible in the organic liquid vehicles commonly employed, the uniformity of reaction can be readily controlled.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from 20° C. to 130° or even 150° C. can be employed as desired, the usual process adapted for commercial production is carried out at a temperature in the range of from 60° C. to 100° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 0–1000 and preferably 0–20 p. s. i. g. obtained by pressuring the system with the monomer being polymerized. The amounts of vehicle employed can be varied over rather wide limits with relation to the monomer and catalyst mixture. Best results are obtained using a concentration of catalyst of from about 0.01 to about 5% and preferably 0.5 to 2% by weight in the vehicle. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution.

The molar ratio of the alkyl aluminum halide component to the tetraalkyl or titanium component of the catalyst mixture can be varied rather widely within the range of from 1:4 to 32:1. In most cases, a molar ratio of the aluminum component to the titanium component of from 1.0 to 5 is preferred, although molar ratios of from 1 to 10 give excellent results. In most commercial applications, the molar ratio of the alkyl aluminum halide to the orthotitanate ester is preferably in the range of from about 1:1 to about 4:1. The polymerization time can be varied as desired from a period of a few minutes or hours to several days. When a continuous process is employed, the contact time in the polymerization zone can also be regulated as desired. In some cases, it is not necessary to employ reaction or contact times much beyond one-half to one hour since a cyclic system can be employed wherein unused reaction mixture is recycled to the charging zone after separation of the polymer.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin of mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The unusual activity of the catalysts embodying this invention is shown by the data set out in Table 1 wherein the only variable was the chain length of the alkyl portion of the orthotitanate ester. The olefin being polymerized in each case was ethylene, and the polymerization was carried out in a heptane vehicle containing 1% by volume of ethyl aluminum sesquibromide together with one-fourth its molar amount of orthotitanate ester. The time of reaction was two hours in each case, and the temperature was held at 60° C.

TABLE 1

| Orthotitanate Activator | Polyethylene Yield (parts by wt.) |
| --- | --- |
| Tetrabutyl orthotitanate | 50 |
| Tetra 2-ethylhexyl orthotitanate | 131 |
| Tetra decyl orthotitanate | 120 |
| Tetra lauryl orthotitanate | 115 |
| Tetra tridecyl orthotitanate | 98 |

As can be seen from Table 1, the yield of polyethylene per unit of catalyst is almost tripled in going from the alkyl ester having a carbon chain length of 4 carbon atoms to that having a chain length of 8 carbon atoms. As is also apparent from the table, the yield begins to drop off sharply when the chain length reaches 13 carbon atoms. The reason for this unusual situation is not understood, and the invention will not be limited by any theory which might be advanced by way of explanation. With tetrastearyl orthotitanate, the yield drops to 43 parts by weight.

The unusual stability and retention of activity of the catalysts embodying this invention as compared to those prepared using a titanium tetrachloride activator is shown in Table 2. The olefin polymerized was ethylene in each case, and the polymerization was carried out for two hours at 60° C. in a heptane solution containing 1% by volume of ethyl aluminum sesquibromide together with one-fourth the molar amount of titanium compound.

TABLE 2

| Titanium Activator | Polyethylene Yield (parts by wt.) | | |
| --- | --- | --- | --- |
| | Fresh Catalyst | Catalyst Stored 7 Days | Percent Loss |
| Titanium tetrachloride | 41 | 18 | 66 |
| Tetra octyl orthotitanate | 131 | 119 | 10 |
| Tetra tridecyl orthotitanate | 98 | 87 | 12 |

Thus it can be seen from Table 2 that the catalyst combinations embodying the invention give greatly improved yields of solid polymer over catalyst combinations containing titanium tetrachloride activator, even when both catalyst mixtures are freshly prepared. Furthermore, the catalyst mixture containing titanium tetrachloride activator lost 66% of its activity during 7 days' storage at room temperature whereas the catalyst mixtures embodying the present invention retained in activity of about 90% after 7 days and gave 2–3 times the yield obtained even with freshly prepared catalyst containing titanium tetrachloride activator.

In practicing the present invention, the reaction is controlled by external cooling and by regulating the ethylene pressure. The catalyst concentration is desirably maintained below 5% only because the evolution of heat at higher concentrations makes control of the reaction difficult. The polymer formed during the reaction usually separates as a finely divided powder during the course of the reaction unless a sufficiently high temperature is employed to maintain the product in solution in the polymerization zone. When the latter method is employed, the product can be readily precipitated by cooling the polymerization mixture. The polymeric product is readily freed of catalyst by washing with alcohol. The first washing is desirably carried out in the absence of air. The polyethylene and other polyolefins obtained in accordance with this invention, both before and after melting, is almost completely colorless. The tendency to darken on heating which is characteristic of many polyethylenes prepared catalytically is absent in the polymers prepared in accordance with this invention.

The invention is illustrated by the following examples of certain preferred embodiments thereof, although it will be understood that the invention is not limited thereby unless otherwise specifically indicated.

*Example 1*

To 500 parts by volume of heptane under nitrogen was added 5 parts by volume of ethyl aluminum sesquibromide and 3.75 parts by volume of tetra 2-ethylhexyl orthotitanate. The reactor was then connected to an ethylene source, and ethylene was introduced under low pressure and in the absence of air while the mixture was being stirred. The polymerization began at once, and within 5 minutes the temperature had risen to 60° C. The reaction was allowed to proceed for 2 hours, and then methanol was added to stop the reaction, and the solid polyethylene product was filtered off. The last traces of catalyst were removed from the polymer by two additional methanol washes. The yield of solid polyethylene was 131 parts by weight, and the polymer melted between 150 and 180° C. The molecular weight of the polymer was 1,100,000. It possessed a density in excess of 0.95 and a crystallinity of the order of 90%. The polymer was completely colorless and could be pressed into colorless films of exceptional toughness and strength. The rigidity of the polymer as compared to conventional high pressure polyethylene made it unusually valuable for preparation of molded and extruded articles where some rigidity coupled with the lack of brittleness is a definite advantage.

*Example 2*

Ethylene was polymerized at a pressure of 10–20 p. s. i. g. in a mixture of 500 parts by volume of heptane, 5 parts by volume of ethyl aluminum sesquibromide, and 3.6 parts by volume of tetrabutyl orthotitanate. The conditions employed were exactly as described in the preceding example. The yield of solid polymer was only 26 parts by weight, or only about one-sixth the yield obtained in the preceding example employing the catalyst combination embodying the present invention. It is thus apparent, that the long chain alkyl orthotitanates give greatly improved results and lend themselves to large-scale commercial production.

*Example 3*

The catalyst mixtures embodying the invention can be used for polymerizing any of the normally gaseous α-monoolefins or mixtures thereof. Thus, propylene was bubbled for 4 hours through the stirred mixture of 5 parts by volume of ethyl aluminum sesquibromide, 3.7 parts by volume of tetra 2-ethylhexyl orthotitanate and 500 parts by volume of heptane which had been prepared in an atmosphere of nitrogen. Heat was evolved for about an hour, and the solid polypropylene which precipitated during the reaction was washed with methanol and methanolic hydrochloric acid to remove the catalyst. The solid, high density, crystalline polypropylene thus obtained was completely colorless and melted in the range of 128–145° C.

*Example 4*

A mixture of 500 parts by volume of heptane, 5 parts by volume of ethyl aluminum sesquibromide, and 3.75 parts by volume of tetra 2-ethylhexyl orthotitanate was prepared in a nitrogen atmosphere. The mixture was stirred while a gas stream composed of substantially equimolar parts of ethylene and propylene was bubbled through the solution. Solid polymer began to separate at once, and the temperature of the reaction mixture rose quickly to 60° C. The reaction mixture was cooled in a water bath to maintain the reaction temperature between 50 and 60° C. After the ethylene-propylene mixture had been introduced for 2 hours, methanol was added to stop the reaction. The solid polymer was recovered by filtration and washed with methanol. Solid ethylene-propylene copolymer was obtained in a yield of 64 parts by weight, and the copolymer melted between 120 and 140° C. The polymer had an ethylene to propylene ratio of 2.06 to 1 and a molecular weight of 110,000.

*Example 5*

A mixture of 500 parts by volume of heptane, 5 parts by volume of ethyl aluminum sesquibromide, and 5 parts by volume of tetra tridecyl orthotitanate was prepared under nitrogen and attached to a source of ethylene. The mixture was an amber solution containing no suspended solid. This was stirred, and ethylene was introduced below the surface of the liquid for 2 hours. The mixture warmed spontaneously to 60° C. within 10 minutes and was maintained at this temperature by external cooling. At the end of the reaction period, 200 parts by volume of absolute methanol was added, and the mixture was stirred for 15 minutes. The colorless polyethylene product was isolated by filtration in a yield of 98 parts by weight of high density, crystalline polymer having a melting point of 155–180° C.

Similar results were obtained with the other catalysts embodying the invention with these and similar α-monoolefins at various concentrations and in various liquid vehicles. The nature of the vehicle, concentration of catalyst, temperature, and pressure did not appear to be of particularly critical limitations, and the invention as defined and as claimed hereinafter appeared to possess excellent utility over its entire scope.

The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

We claim:

1. In the polymerization of at least one aliphatic $C_2$–$C_{10}$ α-monoolefin to form solid polymer, the improvement which comprises effecting the polymerization at 20–130° C. in the presence of a catalytic mixture of a tetraalkyl orthotitanate wherein each alkyl group contains 8–13 carbon atoms and alkyl aluminum halide wherein each alkyl group contains 2–12 carbon atoms.

2. In the polymerization of at least one aliphatic $C_2$–$C_{10}$ α-monoolefin to form solid polymer, the improvement which comprises effecting the polymerization at 20–130° C. in solution in an inert organic liquid in the presence of a catalytic mixture of a tetraalkyl orthotitanate wherein each alkyl group contains 8–13 carbon atoms and a dialkyl aluminum monohalide wherein each alkyl group contains 2–12 carbon atoms.

3. In the polymerization of at least one aliphatic $C_2$–$C_{10}$ α-monoolefin to form solid polymer, the improvement which comprises effecting the polymerization at 20–130° C. in solution in an inert organic liquid in the presence of a catalytic mixture of a tetraalkyl orthotitanate wherein each alkyl group contains 8–13 carbon atoms and a monoalkyl aluminum dihalide wherein each alkyl group contains 2–12 carbon atoms.

4. In the polymerization of at least one aliphatic $C_2$–$C_{10}$ α-monoolefin to form solid polymer, the improvement which comprises effecting the polymerization at 20–130° C. in solution in an inert organic liquid in the presence of a catalytic mixture of a tetraalkyl orthotitanate wherein each alkyl group contains 8–13 carbon atoms and an alkyl aluminum sesquihalide wherein each alkyl group contains 2–12 carbon atoms.

5. In the polymerization of at least one normally gaseous α-monoolefin from the group consisting of ethylene and propylene to form solid polymer, the improvement which comprises effecting the polymerization in solution in an inert organic liquid at a temperature of 20–130° C. and in the presence of a catalytic mixture of tetraalkyl orthotitanate wherein each alkyl group contains 8–13 carbon atoms and an alkyl aluminum halide wherein each alkyl group contains 2–12 carbon atoms, the molar ratio of said alkyl aluminum halide to said tetraalkyl orthotitanate being in the range of from 1:4 to 32:1.

6. In the polymerization of at least one normally gaseous α-monoolefin from the group consisting of ethylene and propylene to form solid polymer, the improvement which comprises effecting the polymerization in solution in an inert organic liquid at a temperature of 20–130° C. and in the presence of a catalytic mixture of tetra 2-ethylhexyl orthotitanate and ethyl aluminum sesquibromide in a molar ratio of from 1:1 to 1:32.

7. In the polymerization of at least one normally gaseous α-monoolefin from the group consisting of ethylene and propylene to form solid polymer, the improvement which comprises effecting the polymerization in solution in an inert organic liquid at a temperature of 20–130° C. and in the presence of a catalytic mixture of tetradecyl orthotitanate and ethyl aluminum sesquibromide in a molar ratio of from 1:1 to 1:32.

8. In the polymerization of at least one normally gaseous α-monoolefin from the group consisting of ethylene and propylene to form solid polymer, the impovement which comprises effecting the polymerization in solution in an inert organic liquid at a temperature of 20–130° C. and in the presence of a catalytic mixture of tetralauryl orthotitanate and ethyl aluminum sesquibromide in a molar ratio of from 1:1 to 1:32.

9. In the polymerization of at least one normally gaseous α-monoolefin from the group consisting of ethylene and propylene to form solid polymer, the improvement which comprises effecting polymerization in solution in an inert organic liquid at a temperature of 20–130° C. and in the presence of a catalytic mixture of tetra tridecyl orthotitanate and ethyl aluminum sesquibromide in a molar ratio of from 1:1 to 1:32.

10. The process which comprises polymerizing ethylene in solution in an inert organic liquid at a temperature of 60–100° C. and a pressure of 0–1000 p. s. i. g. in the presence of a catalytic mixture of tetra 2-ethylhexyl orthotitanate and ethyl aluminum sesquibromide in a molar ratio of from about 1:1 to about 1:4.

11. The process which comprises polymerizing ethylene in solution in an inert organic liquid at a temperature of 60–100° C. and a pressure of 0–1000 p. s. i. g. in the presence of a catalytic mixture of tetradecyl orthotitanate and ethyl aluminum sesquibromide in a molar ratio of from about 1:1 to about 1:4.

12. The process which comprises polymerizing ethylene in solution in an inert organic liquid at a temperature of 60–100° C. and a pressure of 0–1000 p. s. i. g. in the presence of a catalytic mixture of tetralauryl orthotitanate and ethyl aluminum sesquibromide in a molar ratio of from about 1:1 to about 1:4.

13. The process which comprises polymerizing ethylene in solution in an inert organic liquid at a temperature of 60–100° C. and a pressure of 0–1000 p. s. i. g. in the presence of a catalytic mixture of tetra tridecyl orthotitanate and ethyl aluminum sesquibromide in a molar ratio of from about 1:1 to about 1:4.

14. As a catalyst for polymerization of normally gaseous α-monoolefins, a mixture in a molar ratio of from 1:4 to 32:1 of at least one alkyl aluminum halide from the group consisting of dialkyl aluminum monohalides and monoalkyl aluminum dihalides wherein each alkyl group contains 2–12 carbon atoms and a tetraalkyl orthotitanate wherein each alkyl group contains 8–13 carbon atoms.

15. As a catalyst for polymerization of aliphatic $C_2$–$C_{10}$ α-monoolefins, a mixture in a molar ratio of from 1:4 to 32:1 of ethyl aluminum sesquibromide and tetra 2-ethylhexyl orthotitanate.

16. As a catalyst for polymerization of aliphatic $C_2$–$C_{10}$ α-monoolefins, a mixture in a molar ratio of from 1:4 to 32:1 of ethyl aluminum sesquibromide and tetradecyl orthotitanate.

17. As a catalyst for polymerization of normally gaseous aliphatic $C_2$–$C_{10}$ α-monoolefins, a mixture in a molar ratio of from 1:4 to 32:1 of ethyl aluminum sesquibromide and tetralauryl orthotitanate.

18. As a catalyst for polymerization of aliphatic $C_2$–$C_{10}$ α-monoolefins, a mixture in a molar ratio of from 1:4 to 32:1 of ethyl aluminum sesquibromide and tetra tridecyl orthotitanate.

References Cited in the file of this patent

UNITED STATES PATENTS

| | | |
|---|---|---|
| 1,793,935 | Kaufler et al. | Feb. 24, 1931 |
| 1,914,557 | Craver | June 10, 1933 |
| 2,338,428 | Mavity | Nov. 6, 1945 |
| 2,666,756 | Boyd et al. | Jan. 19, 1954 |
| 2,713,044 | McArthur | July 12, 1955 |

FOREIGN PATENTS

| | | |
|---|---|---|
| 534,792 | Belgium | Jan. 31, 1955 |